(12) United States Patent
Johnson et al.

(10) Patent No.: US 11,665,199 B2
(45) Date of Patent: *May 30, 2023

(54) USING CLONED ACCOUNTS TO TRACK ATTACKS ON USER ACCOUNTS

(71) Applicant: PAYPAL, INC., San Jose, CA (US)

(72) Inventors: Raoul Christopher Johnson, San Jose, CA (US); Ran Sun, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/145,819

(22) Filed: Jan. 11, 2021

(65) Prior Publication Data

US 2022/0166796 A1    May 26, 2022

Related U.S. Application Data

(63) Continuation of application No. 16/104,563, filed on Aug. 17, 2018, now Pat. No. 10,893,072.

(51) Int. Cl.
*H04L 9/40* (2022.01)

(52) U.S. Cl.
CPC .......... *H04L 63/1491* (2013.01); *H04L 63/08* (2013.01)

(58) Field of Classification Search
CPC .................... H04L 63/1491; H04L 63/08
See application file for complete search history.

(56) References Cited

U.S. PATENT DOCUMENTS

| 8,695,097 | B1 | 4/2014 | Mathes |
| 8,856,077 | B1 | 10/2014 | Roth et al. |
| 2013/0263226 | A1* | 10/2013 | Sudia ............... G06F 21/60 726/4 |
| 2016/0164861 | A1 | 6/2016 | Treleaven et al. |
| 2019/0116136 | A1* | 4/2019 | Baudart ............ G06F 40/30 |
| 2020/0053121 | A1* | 2/2020 | Wilcox ............. G06F 40/205 |

FOREIGN PATENT DOCUMENTS

WO    WO-2014138984 A1 *  9/2014  ............. G06F 21/55

OTHER PUBLICATIONS

International Appl. No. PCT/US2019/047099, International Preliminary Report on Patentability dated Mar. 4, 2021, 8 pages.
PCT/US19/47099 International Search Report and Written Opinion, dated Nov. 14, 2019; 16 pages.

* cited by examiner

*Primary Examiner* — Nelson S. Giddins
(74) *Attorney, Agent, or Firm* — Haynes and Boone, LLP

(57) ABSTRACT

Methods and systems for using cloned accounts to track attacks on user accounts are described. A user login attempt is detected for a user account from a client computing device. A determination is made that the user is not a legitimate user. The user is routed to a cloned user account. An analysis of the interaction between the user and the cloned user account is performed.

20 Claims, 5 Drawing Sheets

USING CLONED ACCOUNTS TO TRACK ATTACKS ON USER ACCOUNTS

CROSS REFERENCE TO RELATED APPLICATION

The present invention is a Continuation of U.S. patent application Ser. No. 16/104,563, filed Aug. 17, 2018, which is incorporated herein by reference in its entirety.

TECHNICAL FIELD

The subject technology generally relates to deterring malicious activity on user accounts, and more particularly, relates to a system and method that utilizes cloned accounts to track activities of bad actors on compromised user accounts.

BACKGROUND

As the volume of sensitive information stored and transacted over the internet continues to increase, the need to protect user accounts become all the more critical. Various measures to defend against attacks continue to be developed to improve the security of these accounts. One technique widely used by hackers is the account takeover. By illicitly obtaining user credentials, bad actors are able to compromise the accounts of their targets. Once an account has been taken over, the bad actor may use the account for nefarious unauthorized activities until either the owner or the organization to which the account belongs notices unusual activity and takes measures to prevent further activity.

While organizations have taken measures to improve security (e.g., requiring more robust passwords, using 2-factor authentication, implementing security phrases, etc.), not all measures can prevent bad actors from using illicitly obtained credentials to interact with user accounts that are not their own. Furthermore, once a bad actor has "broken into" an account, shutting the bad actor out by resetting the credentials prevents the bad actor from logging into that particular account again, but does little to prevent future attacks. Thus, a method for diverting discovered bad actors to a cloned account so that information may be collected on the bad actor may be useful for mitigating future attacks.

SUMMARY

According to various aspects of the subject technology, a system for using cloned accounts to track attacks on user accounts is described. A user login attempt is detected for a user account from a client computing device. A determination is made that the user is not a legitimate user. The user is routed to a cloned user account. An analysis of the interaction between the user and the cloned user account is performed.

According to various aspects of the subject technology, method for using cloned accounts to track attacks on user accounts is described. A user login attempt is detected for a user account from a client computing device. A determination is made that the user is not a legitimate user. A cloned user account is created, and the user is routed to a cloned user account. An analysis of the interaction between the user and the cloned user account is performed According to various aspects of the subject technology, a non-transitory machine-readable medium having stored thereon machine-readable instructions executable to use cloned accounts to track attacks on user accounts is described. A user login attempt is detected for a user account from a client computing device. A determination is made that the user is not a legitimate user. The user is routed to a cloned user account. An analysis of the interaction between the user and the cloned user account is performed.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Figure 1:
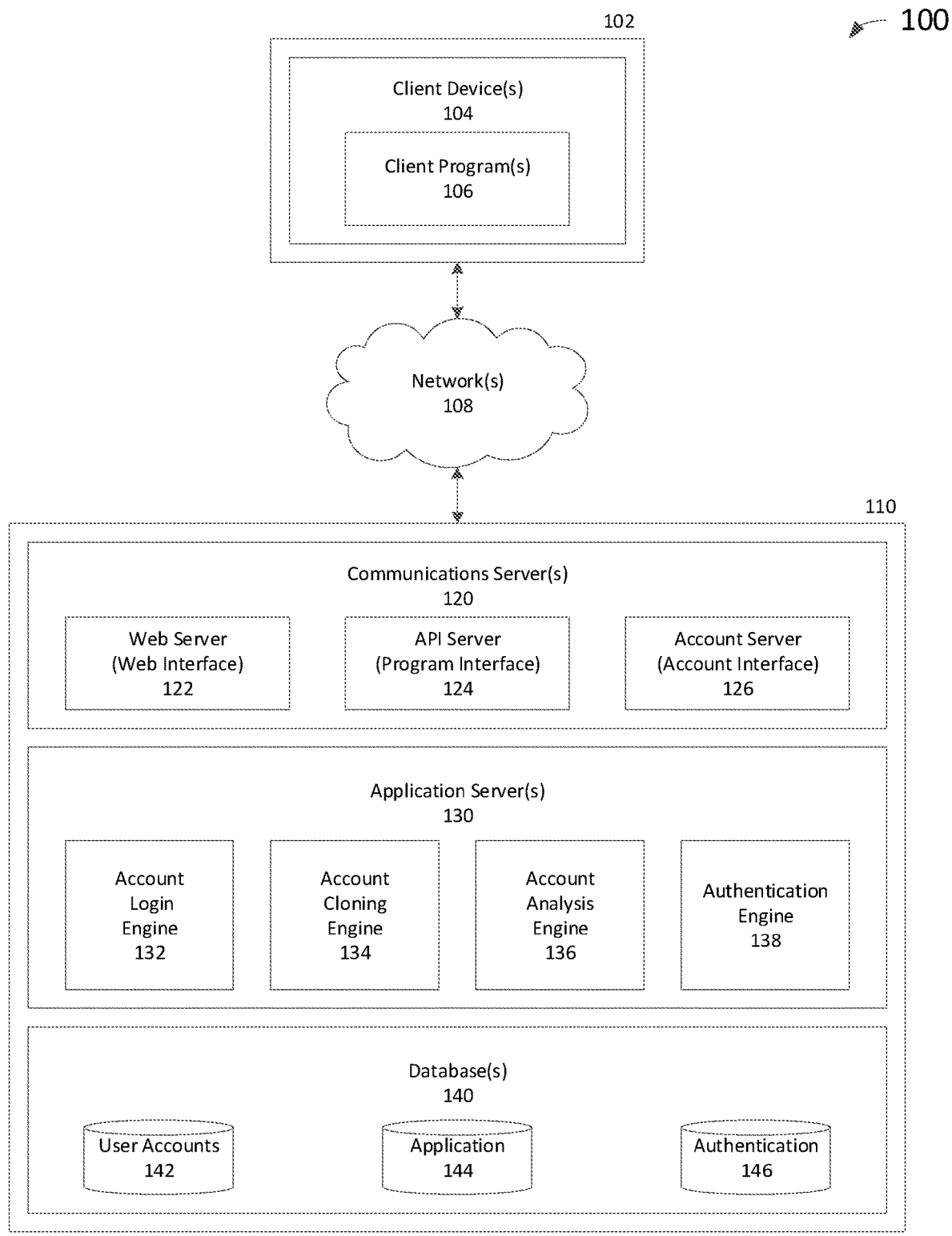
FIG. 1 is a block diagram of an exemplary computing system on which cloned accounts are implemented to track attacks on user accounts.

Personal electronic devices (e.g., smartphones, desktops, tablets, laptops, etc.) are used for a variety of purposes including but not limited to real-time communications, financial transactions, and the transmission of or sharing of data. For these activities to be properly conducted, a user must be authenticated to ensure that the user is who the user claims to be. Numerous applications are provided for users to connect to their accounts which contain sensitive information (e.g., personal information, financial information, etc.). As a result, these applications that serve as gateways to sensitive information become targets for unscrupulous activity.

One common technique employed by hackers is account takeover, where hackers use illicitly obtained credentials to log into accounts of other users. The credentials may be verified in a number of ways, one of which is to use bot nets to attempt large-scale login requests directed against web or native applications using stolen credentials (e.g., username and password pairs). Advancements in computing power has only made it easier for hackers to try larger collections of credentials over a shorter period of time, and thus more likely for hackers to come across a username/password pair that works for an account. While tools have been developed to inhibit high-volume attacks, few tools are directed to providing counter-measures after an account has been infiltrated. Typically, when an account takeover is discovered, or when the account is known to have been compromised, the account password is typically changed, or the account is otherwise locked down to prevent further losses at the hands of bad actors. Once the credentials possessed by the bad actor is no longer useful, no further action is taken.

Tracking illicit activity of the bad actors on accounts identified as having been compromised, however, may provide useful information. Such activity may be tracked if the bad actor believes he has successfully infiltrated an account. For example, when a client logs in with credentials presumed to have been compromised, rather than shutting that client out after a failed step-up authentication request, the client is routed to a separate infrastructure that inspects the user's activity more thoroughly. As such, the compromised credentials may be leveraged to the advantage of the account provider and/or holder. In some instances, when an account is flagged as having been taken over (e.g., via a dial-in to a call center), the account may be automatically cloned, and a password reset automatically implemented for the actual account of the legitimate owner. The cloned account, which may use slightly different personal details to protect the privacy of legitimate users, is given a separate flow that may include additional tracking protocols that can be used to identify the originator of the bad acts.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

FIG. 1 is a block diagram of an exemplary computing system on which a determination of the legitimacy of clients using ephemeral URL passwords may be performed. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed, and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may also include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or an account server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or an account interface provided by account server 126. It may be appreciated that web server 122, API server 124, and account server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Account server 126 may be arranged to communicate with various account clients and/or applications and may provide an account interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include an account login engine 132, account cloning engine 134, account analysis engine 136, and/or authentication engine 138. These servers and/or components, which may be in addition to other servers, may be structured and arranged to analyze those accounts that may be subject to malicious activity.

Application servers 130, in turn, may be coupled to and capable of accessing one or more databases 140 including user accounts database 142, application database 144, and/or authentication database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
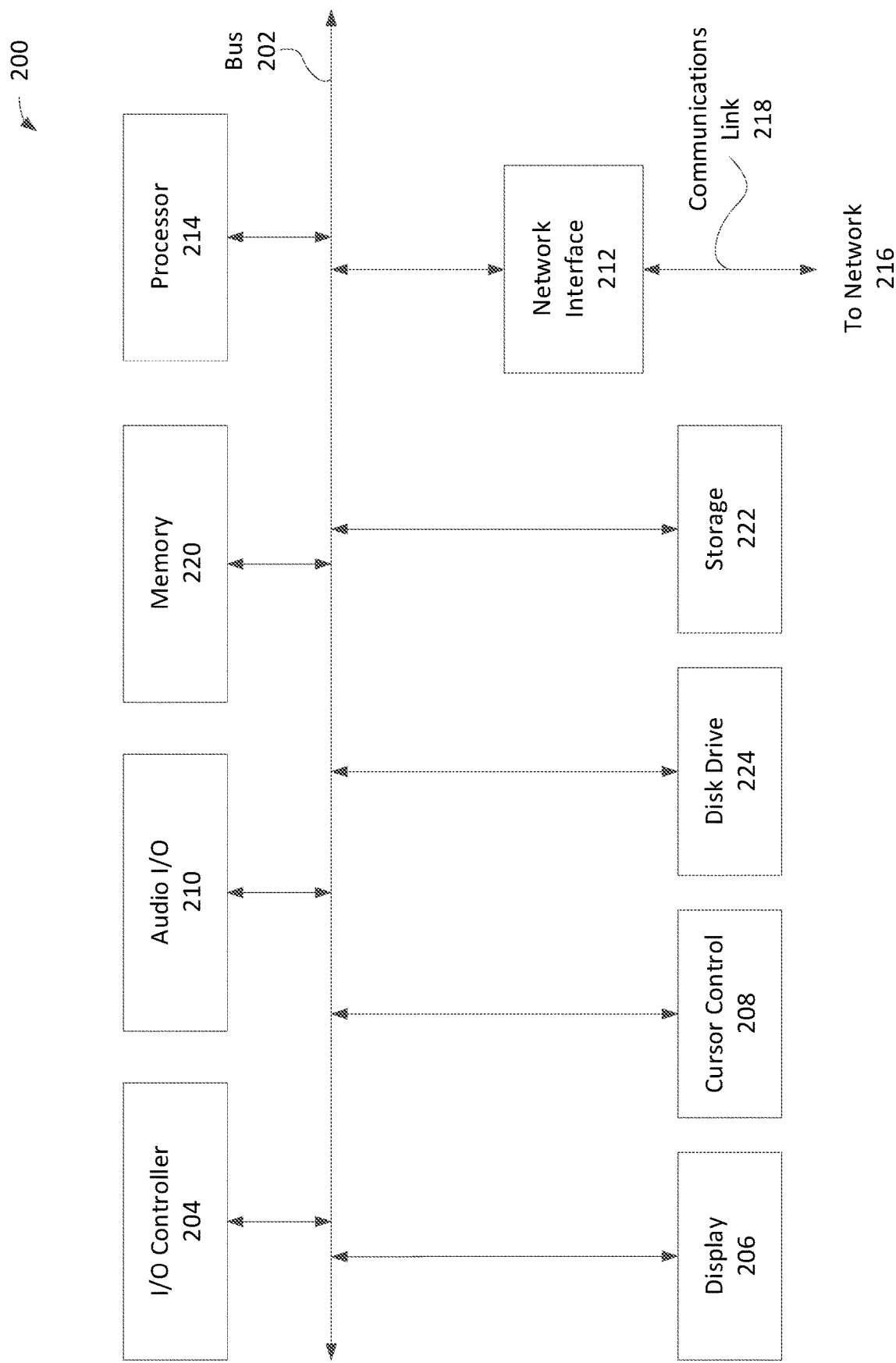
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

One strategy that may be employed to defend against account takeovers is to track illicit activity of the bad actors so that information may be garnered to prevent future incidents. In order to track such activity, the bad actor must believe he has successfully infiltrated an account, and that he has not been detected. For example, when a hacker attempts to log in with credentials presumed to have been compromised, instead of shutting the hacker out with a failed authentication request, the hacker may be routed to a separate infrastructure that inspects the hacker's activity more thoroughly.

Figure 3:
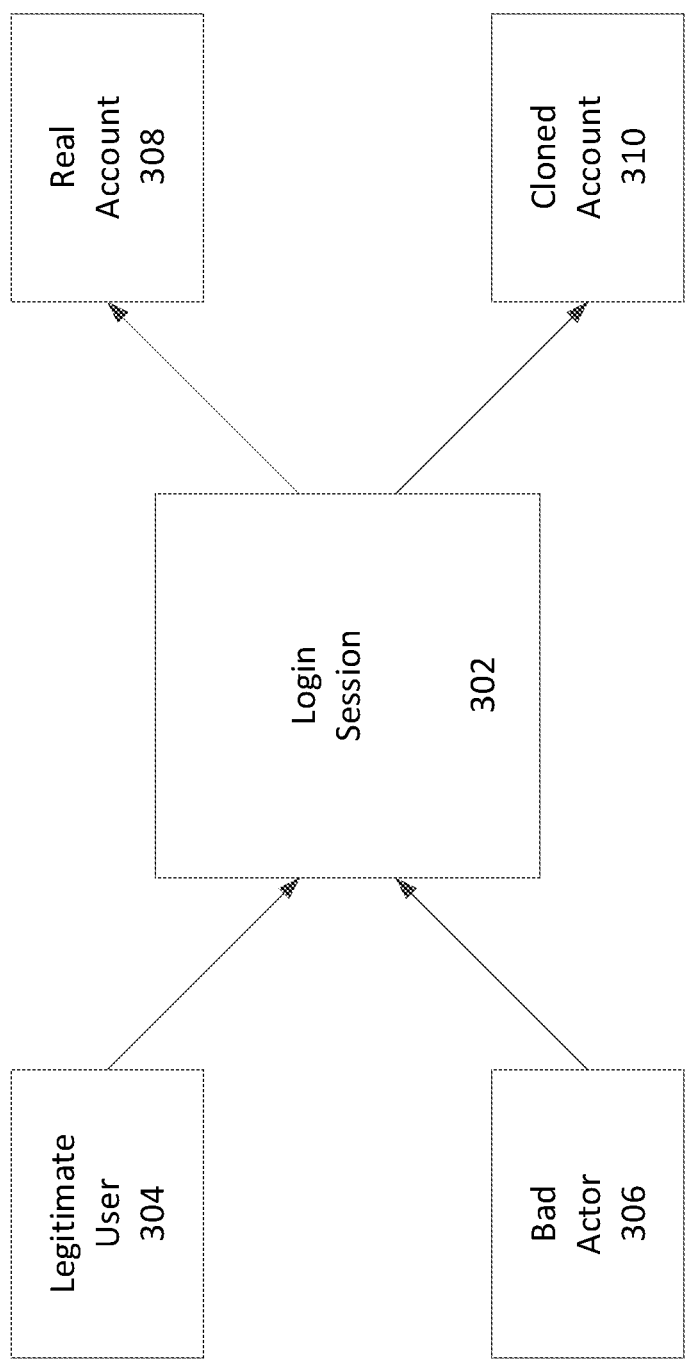
FIG. 3 illustrates a login flow for directing bad actors to cloned accounts used to track attempted attacks on user accounts.

FIG. 3 illustrates a login flow for directing bad actors to cloned accounts used to track attempted attacks on user accounts. In an exemplary embodiment, when a login session 302 is initiated on the system, the account login engine 132 makes a determination as to whether the login client is one of a legitimate user 304 or bad actor 306. This determination may be made in one of a variety of ways, which is discussed in more detail below. Once the determination is made, the login client may be directed to one of two infrastructures. When the login client is determined with some degree of certainty to be a legitimate user 304, the login client is directed to the real account 308 corresponding to the credentials provided. If, however, the login client is determined to be a bad actor 306, the login client is then routed to a cloned account 310.

The real account 308 provides all the normal functionalities of a user account with no limitations. The cloned account 310, on the other hand, is one that mimics the real account 308, but does not provide any connectivity to the actual account. In other words, from a user experience perspective, the cloned account 310 functions similarly to a real account 308. However, any interaction the bad actor 306 may have with the cloned account 310 is a purely fabricated by the system.

In some embodiments, the user information of a cloned account 310 is completely fictitious. For example, if the bad actor 306 is attempting to log on as John Smith, the system will provide certain details that relate to John Smith, such as the name and age, but will fabricate the remainder of the user information, such as social security number and birthdate. Thus, while the bad actor 306 is led the believe he has successfully infiltrated John Smith's account, none of the information provided by the cloned account 310 is sensitive in nature, and just enough information is provided in the cloned account 310 to maintain a level engagement of the bad actor 306 so that certain information of the bad actor 306 may be tracked in order to help stymie future hacks of similar nature.

Figure 4:
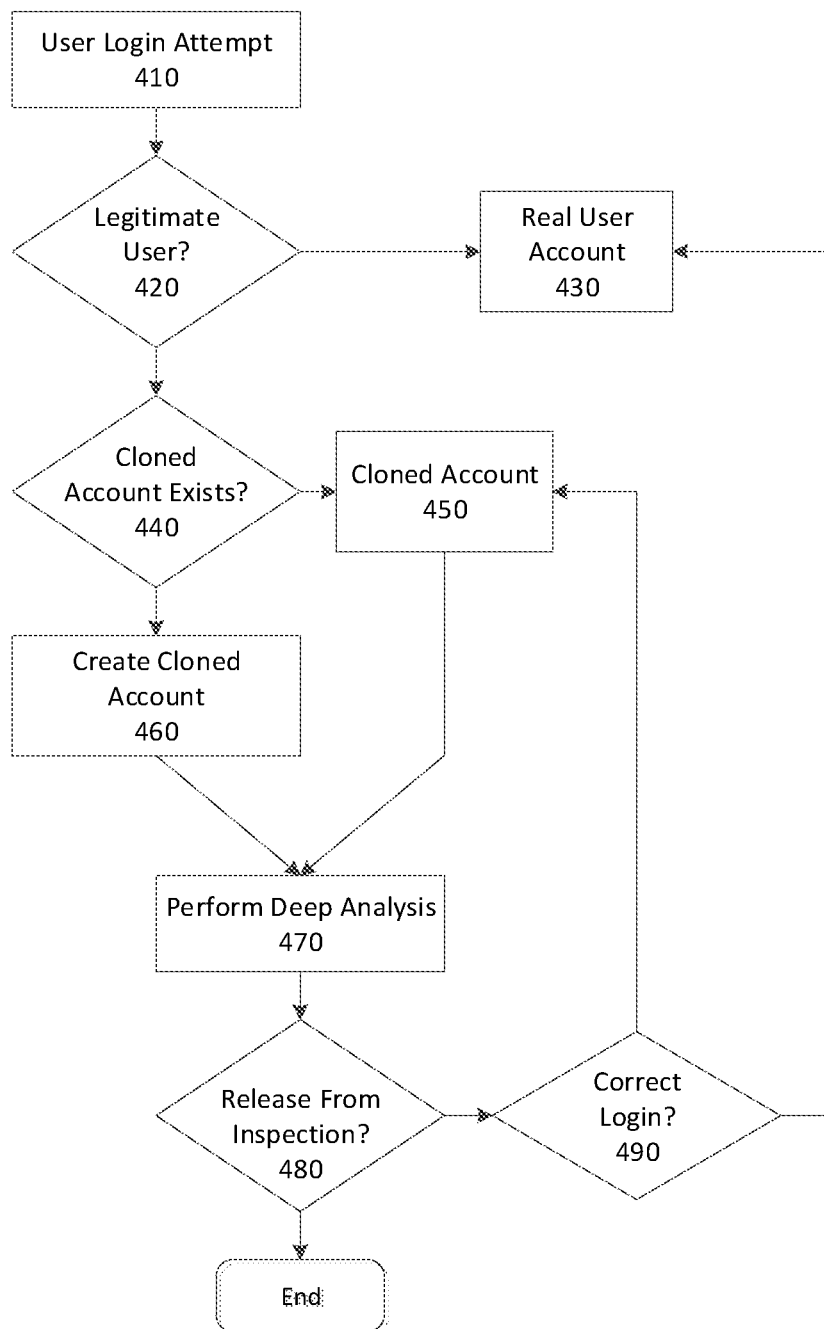
FIG. 4 illustrates an exemplary process 400 for implementing clone accounts used to track attempted attacks on user accounts.

FIG. 4 illustrates an exemplary process 400 for implementing clone accounts used to track attempted attacks on user accounts. At operation 410, a user login attempt is initiated via a client computing device. When a login session 302 is initiated, the system needs to make a determination of the legitimacy of the user of the client computing device, as shown in operation 420. Generally, an authentication process is used to determine the legitimacy of a user. For example, when credentials (e.g., a username/password pair) are entered, the system makes a determination as to whether the credentials match one of the accounts and that the password is correct. If the credentials are proper, the client computing device is directed to a real user account in operation 430.

Conversely, if either the username/password pair is incorrect, the user of the client computing device may be presumed to be illegitimate. Examples of other metrics that may be used to determine whether the user of the client computing device is illegitimate (i.e., a bad actor) include the detection of a known bad internet protocol (IP) address or visitor identification (VID). Also, the user's behavior on the client computing device, as well as the operating system run by the client computing device may be signals that are considered by the decision-making process. These metrics may be used to produce a risk rank. A risk rank that exceeds a predetermined level will suggest that the user of the client computing device is illegitimate.

Under conventional systems, the only determination that's made is whether credentials entered are correct or not. An incorrect entry of credentials results in a denial of access that is typically accompanied by a prompt indicating that the credentials are incorrect and that the user should try reentering the credentials. Process 400, on the other hand, proceeds to make a determination as to whether a cloned account exists. This happens in operation 440 when a user is presumed to be illegitimate. If a cloned account exists, then the client computing device is directed to a cloned account in operation 450. If a cloned account does not exist, then one can be created in operation 460.

In some embodiments, an additional check is performed before a client computing device that submits the wrong credentials gets either diverted to a cloned account or, if one doesn't exist, causes one to be created. For instance, a legitimate user may accidentally mistype his credentials into the client computing device. It would not make sense for such a user to be directed to a cloned account. Accordingly, the system may make a determination as to which incorrect credential entries warrant a routing to a cloned account. In some embodiments, certain accounts may be flagged as accounts that may have been subject to potential fraud. One example is that a legitimate user may call in about a compromised account. That is, when the legitimate user believes his account has been hacked, he can notify the organization to which his account belongs that he needs his password reset.

Alternatively, the organization may obtain a list of account credentials that may have been compromised through a variety of means and distributed publicly. Examples of this include files posted on various forums and credentials that are exposed and made available via reported breaches (e.g., credential dumps on social media, open forums, and dark web marketplaces). While the list of credentials may not include any that actually match to ones within a specific organization, that someone attempts to use credentials from that list is an indication that that person is not a legitimate user. Thus, even if the credentials do not correspond to an account within the organization, a cloned account may be created in order to track the activity of the user attempting to use the credentials.

Additional indication that an account may have been hacked may include the type of activity the user engages in once he has infiltrated another user's account. For example, the user may attempt to change the associated email address and/or the password so that the actual owner of the account cannot access the account. Such activity, when coupled with other unscrupulous activity, provides a strong signal that the account has been taken over by a bad actor. As such, the next time the suspected bad actor attempts to log into the account, he may be diverted to a cloned account instead. The actual owner may further be informed of this activity and may be provided an option to reset his password or have his password reset automatically. As such, two accounts for the same user may exist concurrently, where one is the actual and the other is the cloned account.

When suspicious activity is detected by the system, the owner of the account maybe be subject to a verification process. In some instances, the owner must endure an authentication process (e.g., answer security questions, enter a code provided by organization via email or phone, etc.), to prove his identity. Once verified, the owner may continue to interact with the actual account. Instead of simply discarding the previously used credentials, a cloned account that closely mimics the previous account may be created so that the bad actor associated with the detected suspicious activity may continue to engage with the account. This engagement provides an opportunity for a deep analysis of the interaction between the client computing device of the bad actor and the cloned account to be performed in operation 470.

In some embodiments, this deep analysis includes de-anonymization techniques that attempts to detect if the bad actor is attempting to mask their location by connecting via a proxy to determine the bad actor's location. This deep analysis could include monitoring and tracking the actions of the bad actor in an effort to ascertain their intentions. Additionally, this deep analysis could perform tests to determine if the user is a legitimate user, a bad actor performing credential stuffing, or some script-based automated attack (e.g., by performing statistical analysis on mouse click timings). This deep analysis could also include device fingerprinting, or the gathering of multiple metrics about the device (e.g., canvas information, browser version, etc.). If the user is determined to be a bad actor, the results of this deep analysis can be used to both enhance the current security controls that are in place and to assist future possible involvement with legal authorities.

After performing the deep analysis in operation 470, the system may determine whether the client computing device is to be released from inspection in operation 480. For example, one situation that may cause a legitimate user to be pushed into a newly created cloned account is that the legitimate use may be using a new machine (e.g., a new smartphone) that is not recognized by the organization. During the performance of the deep analysis, the system may determine that the presumably illegitimate user is actually the owner/authorized user of the account. As such, the system may release the client computing device from the cloned account in operation 480, and then prompt the user to input his credentials once again. If the system determines in operation 490 that the credentials are proper, then the client computing device is returned to the real user account. If the system determines that the credentials are improper, then the client computing device is routed to the cloned account, where more information may be collected on the user.

Figure 5:
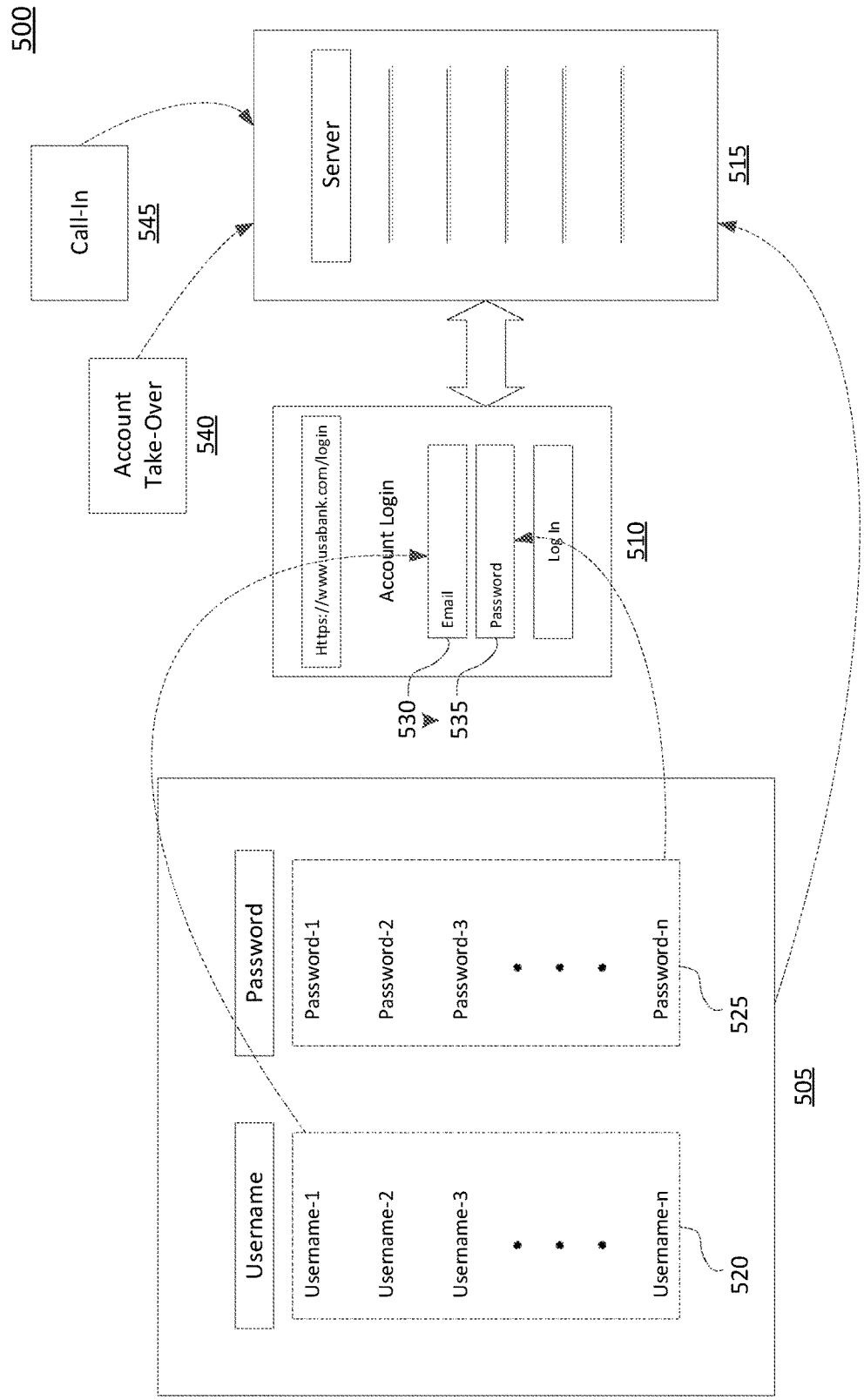
FIG. 5 provides an illustrative depiction of a credential stuffing attempt on a computing device within a network of computing devices.

FIG. 5 provides an illustrative depiction of a credential stuffing attempt on a computing device within a network of computing devices. A bad actor may utilize an illicitly obtained list of credentials 505 to attempt logins on a web browser 510 running on a client computing device. The web browser is communicatively coupled to a server 515 via a network connecting the client computing device to the server 515.

In this example, the username 520 and password 525 pairs are individually tried in the username entry box 530 and password entry box 535 on the web browser 510. When the server 515 detects that the web browser 510 of the client computing device attempts a login, the server 515 makes a determination whether the client computing device is being operated by a legitimate user. The server, for example, may compare the username 520 and password 525 pair entered into the client computing device to a list of credentials known to have been compromised. If a match is detected, the system determines that the user of the client computing device may be a bad actor attempting to infiltrate an account. As discussed above in reference to FIG. 4, when a client computing device is determined to be operated by an illegitimate user (i.e., a bad actor), the user may be directed to a cloned account here a deep analysis is performed. During this analysis, the user's behavior is tracked. If, through the analysis, the user is determined to be legitimate, the user may be released back to the real account.

Since bad actors using techniques like credential stuffing rely on the ability to try a large number of credentials, creating cloned accounts for some of those accounts will slow down the infiltration process because the bad actors won't know that the account they believe they've hacked into may be a cloned account. If, hypothetically speaking, 10,000 credentials are tried and 300 cloned accounts are created, the bad actor would need a significant amount of time to pursue each of the 300 "leads" that's generated by a seemingly successful login to cloned accounts. Thus, by creating these cloned accounts, bad actor cannot tell whether they are actually breaking into an account, or if they're logged into the actual account.

In some embodiments, the list of known compromised credentials may be obtained in the same manner that bad actors obtain them, such as from online forums and illicit marketplaces. In addition to relying on illicitly obtained lists of credentials, the server may also receive indication of a call-in 545 from a user reporting unusual activity on his account. Alternatively, certain activity (e.g., activity typically engaged in by bad actors) may be identified as an account take-over 540. Either of these two additional signals may cause the client computing device to be directed to a cloned account on which the use may be tracked. The information garnered from the tracking of illicit activity may be used to prevent future incidents.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for tracking attacks on user accounts, comprising:
 a non-transitory memory storing instructions; and
 one or more hardware processors coupled to the non-transitory memory and configured to read the instructions from the non-transitory memory to cause the system to perform operations comprising:
  detecting an attempt to access, from a client computing device, a user account;
  determining that the attempt to access fails an authentication process required for accessing the user account;
  calculating, in response to determining that the authentication process has failed, a risk rank of the attempt to access based on at least a device parameter or a communication protocol parameter associated with the client computing device;
  determining a cloned user account associated with the user account, wherein the cloned user account comprises fictitious user information based on the user account and an account activity tracking operation for activities performed by the cloned user account; and
  routing, in response to determining that the calculated risk rank exceeds a predetermined level, the attempt to access to the cloned user account.

2. The system of claim 1, wherein, prior to determining the cloned user account, the operations further comprise:

creating a new cloned user account based on the fictitious user information and the account activity tracking operation.

3. The system of claim 1, wherein the operations further comprise analyzing, after routing the attempt to access to the cloned user account, activity on the cloned user account to identify unusual behavior.

4. The system of claim 1, wherein the risk rank is calculated based on at least one of a determined location from which access to the user account is attempted, an identification associated with the client computing device, a user behavior on the client computing device, or an operating system used by the client computing device.

5. The system of claim 1, wherein the risk rank of the attempt to access is mitigated by a determination that credentials incorrectly entered for the authentication process is a result of a typographical error.

6. The system of claim 1, wherein the risk rank of the attempt to access is elevated by a determination that credentials properly entered for the authentication process is included in a blacklist of credentials.

7. The system of claim 1, wherein at least a portion of information presented in the cloned user account is the fictitious user information generated based on at least user information or financial information associated with the user account.

8. A method for tracking attacks on user accounts, the method comprising:
   detecting an attempt to access, from a client computing device, a user account;
   determining that the attempt to access fails an authentication process required for accessing the user account;
   calculating, in response to determining that the authentication process has failed, a risk rank of the attempt to access based on at least a device parameter or a communication protocol parameter associated with the client computing device;
   determining a cloned user account associated with the user account, wherein the cloned user account comprises fictitious user information based on the user account and an account activity tracking operation for activities performed by the cloned user account; and
   routing, in response to determining that the calculated risk rank exceeds a predetermined level, the attempt to access to the cloned user account.

9. The method of claim 8, wherein, prior to determining the cloned user account, the method further comprises:
   creating a new cloned user account based on the fictitious user information and the account activity tracking operation.

10. The method of claim 8, further comprising analyzing, after routing the attempt to access to the cloned user account, activity on the cloned user account to identify unusual behavior.

11. The method of claim 8, wherein the risk rank is calculated based on at least one of a determined location from which access to the user account is attempted, an identification associated with the client computing device, a user behavior on the client computing device, or an operating system used by the client computing device.

12. The method of claim 8, wherein the risk rank of the attempt to access is mitigated by a determination that credentials incorrectly entered for the authentication process is a result of a typographical error.

13. The method of claim 8, wherein the risk rank of the attempt to access is elevated by a determination that credentials properly entered for the authentication process is included in a blacklist of credentials.

14. The method of claim 8, wherein at least a portion of information presented in the cloned user account is the fictitious user information generated based on at least user information or financial information associated with the user account.

15. A non-transitory machine-readable medium having stored thereon machine-readable instructions executable to cause performance of operations comprising:
   detecting an attempt to access, from a client computing device, a user account;
   determining that the attempt to access fails an authentication process required for accessing the user account;
   calculating, in response to determining that the authentication process has failed, a risk rank of the attempt to access based on at least a device parameter or a communication protocol parameter associated with the client computing device;
   determining a cloned user account associated with the user account, wherein the cloned user account comprises fictitious user information based on the user account and an account activity tracking operation for activities performed by the cloned user account; and
   routing, in response to determining that the calculated risk rank exceeds a predetermined level, the attempt to access to the cloned user account.

16. The non-transitory machine-readable medium of claim 15, wherein, prior to determining the cloned user account, the operations further comprise:
   creating a new cloned user account based on the fictitious user information and the account activity tracking operation.

17. The non-transitory machine-readable medium of claim 15, wherein the operations further comprise analyzing, after routing the attempt to access to the cloned user account, activity on the cloned user account to identify unusual behavior.

18. The non-transitory machine-readable medium of claim 15, wherein the risk rank is calculated based on at least one of a determined location from which access to the user account is attempted, an identification associated with the client computing device, a user behavior on the client computing device, or an operating system used by the client computing device.

19. The non-transitory machine-readable medium of claim 15, wherein the risk rank of the attempt to access is mitigated by a determination that credentials incorrectly entered for the authentication process is a result of a typographical error.

20. The non-transitory machine-readable medium of claim 15, wherein the risk rank of the attempt to access is elevated by a determination that credentials properly entered for the authentication process is included in a blacklist of credentials.

* * * * *